Patented Mar. 21, 1939

2,151,517

UNITED STATES PATENT OFFICE 2,151,517

PREPARATION OF ARYLNITROALKANOLS

Jonas Kamlet, Brooklyn, N. Y.

No Drawing. Application July 21, 1938,
Serial No. 220,509

7 Claims. (Cl. 260—618)

The present invention relates to arylnitroalkanols and, more specifically, to improvements in the synthesis of compounds of the type R.CHOH.CHR'.NO$_2$, where R represents an aryl group (such as phenyl, o-tolyl, alphanaphthyl, etc.) which may be substituted in the ring (such as m-hydroxyphenyl, m,p-dihydroxyphenyl, p-chlor, o-tolyl, etc.) and R' represents hydrogen or an alkyl group. These compounds are useful as intermediates in the synthesis of aryl-methylaminoalkanols, which comprise a group of important pharmaceuticals including ephedrine, epinephrine, sympathol and neo-synephrin.

As described by Nagi (U. S. Patents Nos. 1,356,877, 1,399,144 and 1,973,647), the only means heretofore available for the synthesis of arylnitroalkanols consisted in reacting an aromatic aldehyde with a nitroparaffin in the presence of an aqueous solution of a weak alkaline substance. The yields obtained by this procedure are very unsatisfactory while the condensation product finally obtained must be separated from a considerable amount of unreacted aldehyde and nitroparaffin. In the case of mono- or di-hydroxy-arylnitroalkanols, this is further complicated by the fact that these compounds are unstable in alkaline solution and are readily oxidized, even in the absence of air, by the nitroparaffin. Thus, in order to effect the condensation of a mono- or di-hydroxyarylaldehyde with a nitroparaffin, the phenolic groups in the former compound must be blocked, e. g. by acetylation.

I find that almost quantitative yields of arylnitroalkanols may be obtained by reacting an alkali-metal bisulphite addition-product of an aryl aldehyde with an alkali-metal salt of a nitroparaffin in aqueous solution or suspension. As is well known, nitroparaffins in which the alkyl radical is primary or secondary react readily with alkali-metal hydroxides, carbonates and bicarbonates to form salts of the aci-nitro form. Due to the strong electropositive nature of the nitro group, all nitroparaffins are characterized by reactions due to a labile hydrogen on the alpha carbon. It is this labile hydrogen which is displaced by the alkali-metal ion and a tautomeric state exists between the aci-nitro form of the nitroparaffin which acts like a salt of a nitronic acid, and the nitro form in which the alkali-metal ion acts as if it were directly linked to the alpha carbon, thus:

$$CHR':NO.OM \rightleftharpoons M.CHR'.NO_2$$

where M represents an alkali metal (sodium, potassium or lithium).

It is probable that the formation of the arylnitroalkanol is a result of the interaction of the alkali-metal bisulphite addition-product of the aryl aldehyde with the latter, or nitro-tautomer of the nitroparaffin, thus:

R.CHOH.SO$_2$OM+M.CHR'.NO$_2$→
R.CHOH.CHR'.NO$_2$+M$_2$SO$_3$

The process may be carried out by vigorously agitating an aromatic aldehyde with an aqueous solution of an equimolecular weight of alkali-metal bisulphite until the formation of the addition-product is complete. To the resultant solution or suspension is now added slightly more than the theoretical amount of nitroparaffin dissolved in an aqueous caustic alkali solution. The mixture is stirred for some time, with or without heating, until the separation of the arylnitroalkanol is complete. The latter is recovered in the usual manner and is sufficiently pure to be used without further treatment in the preparation of the aryl-methylaminoalkanol.

Unlike the Nagai processes, this procedure may also be used in the preparation of mono- and di-hydroxyphenylnitroalkanols without first blocking the phenolic groups. The sodium sulphite formed as a by-product of the interaction of the two reagents serves as an effective anti-oxidant. There can thus be obtained a new group of compounds, including the o-, m- and p-hydroxy-phenylnitroalkanols, the o,p- and m,p-dihydroxy-phenylnitroalkanols and the m-alkoxy, p-hydroxyphenylnitroalkanols, which could not previously be obtained by the direct condensation of aldehyde and nitroparaffin. These are all crystalline compounds, readily soluble in caustic alkali solutions, insoluble in dilute mineral acids and in water, moderately soluble in all organic solvents and in glacial acetic acid.

The conversion of these arylinitroalkanols to the pharmacologically active aryl-methylamino-alkanols is readily effected by reduction and subsequent methylation of the resultant arylalkanol-amine. This may also be accomplished in a single step by reducing the arylnitroalkanol in the presence of formaldehyde, as described by Nagai (U. S. Patents Nos. 1,356,877 and 1,399,144). Thus, 1-phenyl,2-nitropropanol yields dl-ephedrine, 1-phenyl,2-methylaminopropanol; 1-(3',4'-dihydroxyphenyl), 2-nitroethanol yields dl-epinephrine, 1-(3',4'-dihydroxyphenyl), 2-methylaminoethanol; 1-(4'hydroxyphenyl),2-nitroethanol yields sympathol, 1-(4'-hydroxyphenyl),2-methylaminoethanol, while 1-(3'-hydroxyphenyl),2-nitroethanol yields racemic neo-synephrin, 1-(3'- hydroxyphenyl),2-methylaminoethanol. All the compounds described in the present application are, of course, racemic, as is always the case when a molecule with one or more asymmetric carbons is synthesized.

The following examples are intended to define and illustrate this invention, but in no way to limit it to the reagents, proportions or conditions described therein.

Example I 10.7 kgs. of tech. benzaldehyde is vigorously agitated with a solution of 11.0 kgs. of sodium bisulphite in 50.0 liters of water until the formation of the addition-product is complete. Simultaneously, 8.25 kgs. of nitroethane is dissolved in a solution of 4.5 kgs. of caustic soda in 20.0 liters of water and the resultant warm solution is added, with vigorous stirring to the magma of benzaldehyde sodium bisulphite. The mixture is agitated for thirty minutes and then allowed to stand overnight.

The aqueous portion of the mixture is now siphoned off from the supernatant layer of oily phenylnitropropanol and replaced with a fresh solution of 11.0 kgs. of sodium bisulphite in 50.0 liters of water. The mixture of phenylnitropropanol and bisulphite solution is now vigorously agitated for fifteen minutes in order to remove and recover small amounts of unreacted benzaldehyde, and is then again allowed to stratify. This time, the phenylnitropropanol is siphoned off and filtered to remove a small amount of resinous material. The aqueous solution of sodium bisulphite remaining behind is reacted with benzaldehyde, as described above, thus making the process continuous.

The 1-phenyl,2-nitropropanol thus obtained is a colorless oil, specific gravity 1.14 at 20° C., odorless when pure, volatile with steam and boiling at 150°–165° C. under a pressure of 5 mm. of mercury. It is soluble in alcohol, ether, acetone, chloroform, carbon tetrachloride, benzene and glacial acetic acid. On reduction in aqueous alcohol solution in the presence of formaldehyde, it forms dl-ephedrine.

The yield of 1-phenyl,2-nitropropanol obtained by this procedure is 17.1 to 17.5 kgs.

Example II 138 grams of protocatechuic aldehyde is vigorously agitated with a solution of 105 grams of sodium bisulphite in one liter of water until the formation of the addition-product is complete. 68 grams of nitromethane is now dissolved in a solution of 45 grams of sodium hydroxide in 250 cc. of water, and added with vigorous stirring to the aldehyde-bisulphite compound. The mixture is now heated to 100° on the water-bath, with occasional stirring and is then allowed to cool spontaneously to room temperature. After standing for 24 hours in the refrigerator, the precipitated 1-(3',4'-dihydroxyphenyl),2-nitroethanol is filtered off by suction and washed with water. The moist filter-cake may be dissolved in aqueous alcohol and reduced directly in the presence of formaldehyde to dl-epinephrine. The yield of 1-(3',4'-dihydroxyphenyl),2-nitroethanol, m. 139° C., is 185 grams.

By substituting 122 grams of m-hydroxybenzaldehyde for the protocatechuic aldehyde in the above example, the final product would be 1-(3'-hydroxyphenyl),2-nitroethanol which yields racemic neo-synephrin on reduction in the presence of formaldehyde. The corresponding para isomer yields 1-(4'-hydroxyphenyl),2-nitroethanol from which sympathol may be synthesized.

Having described my invention, what I claim and desired to protect by Letters Patent is:

1. A process for preparing arylnitroalkanols which comprises reacting an alkali-metal bisulphite addition-product of an aromatic aldehyde with an alkali-metal salt of a nitroparaffin.

2. A process of preparing arylnitroalkanols which comprises reacting a compound of the type R.CHOH.SO₂OM with a compound of the type M.CHR'.NO₂ (or CHR':NO.OM), where R represents an aryl group which may be substituted on the ring, R' represents a member of a group consisting of hydrogen and alkyl and M represents an alkali metal.

3. A process of preparing 1-phenyl,2-nitropropanol which comprises reacting an alkali-metal bisulphite addition-product of benzaldehyde with an alkali-metal salt of nitroethane.

4. A process of preparing 1-(hydroxyphenyl),2-nitroethanols which comprises reacting an alkali-metal bisulphite addition-product of a hydroxybenzaldehyde with an alkali-metal salt of nitromethane.

5. A process of preparing 1-(3',4'-dihydroxyphenyl),2-nitroethanol which comprises reacting an alkali-metal bisulphite addition-product of protocatechuic aldehyde with an alkali-metal salt of nitromethane.

6. The compounds of the following general formula:

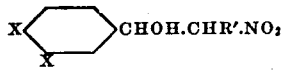

where one X represents a hydroxy group and the other X represents a member of a group consisting of hydrogen, hydroxy and alkoxy, and R' represents a member of a group consisting of hydrogen and alkyl.

7. The compounds obtained by reacting an alkali-metal bisulphite addition-product of an aldehyde of the general formula:

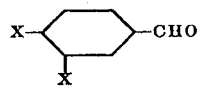

where one X represents a hydroxy group and the other X represents a member of a group consisting of hydrogen, hydroxy and alkoxy, with an alkali-metal salt of a nitroparaffin.

JONAS KAMLET.